Patented Jan. 30, 1934

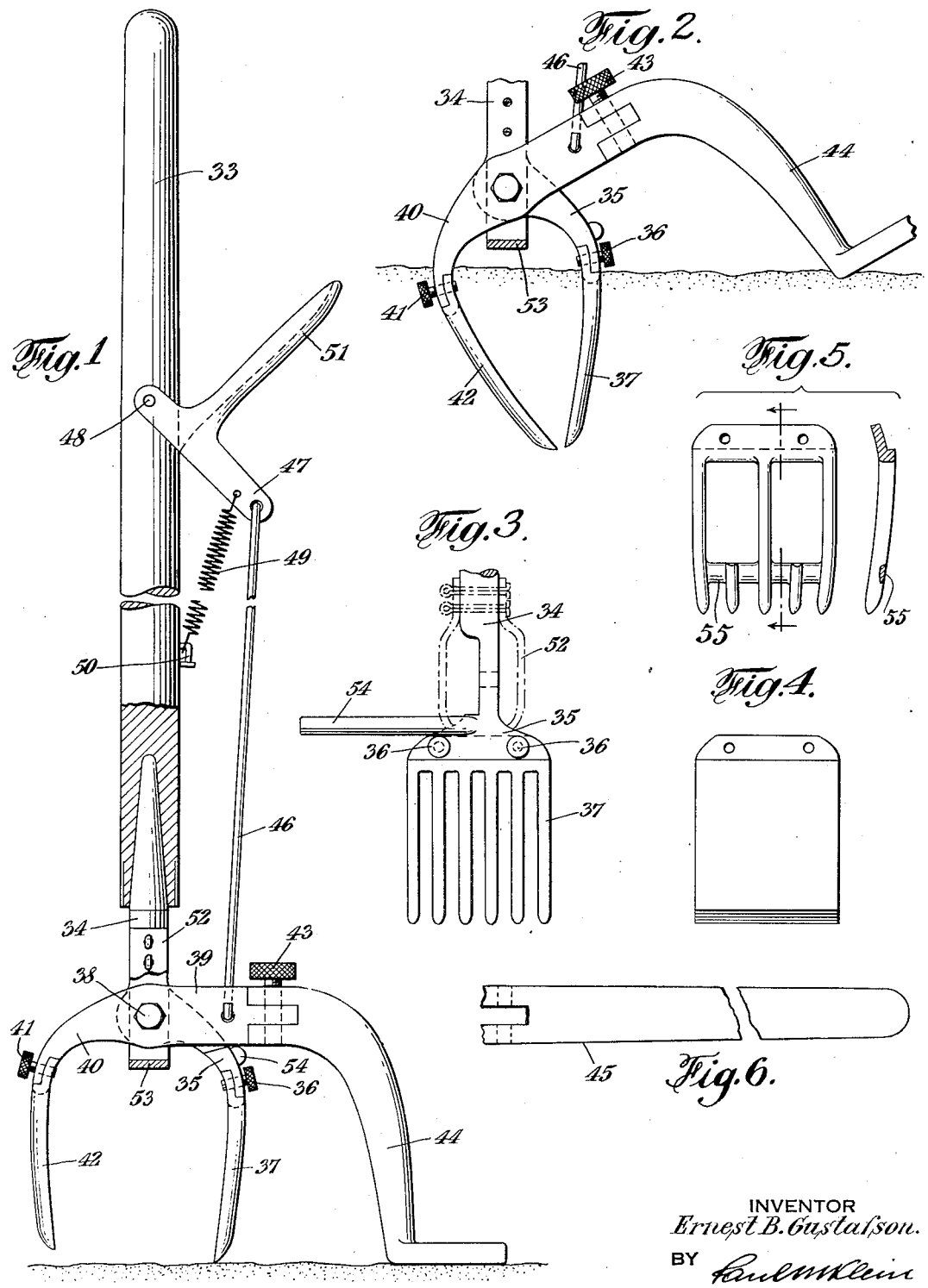

1,945,311

UNITED STATES PATENT OFFICE 1,945,311

AGRICULTURAL IMPLEMENT

Ernest B. Gustafson, New York, N. Y.

Application August 25, 1932. Serial No. 630,402

6 Claims. (Cl. 55—65)

This invention relates to agricultural implements in general, and particularly to what is known as "weed pullers."

One of the objects of my invention is to provide a simple, inexpensive and effective device of this kind, by means of which plants or weeds may be extracted from the earth with a relatively small effort, and which will hold the plant or weed with its root securely gripped until removed from the soil.

Another object of my invention is to provide in connection with my device suitable means arranged to close upon the weed when forced into the earth, and which may be held in the closed position until the weed is extracted and ready to be discharged.

Another object of my invention is to provide in connection with my device means whereby parts of the operating mechanism are sheltered against coming in forcible contact with dirt, the same means serving for the purpose of limiting the depth travel of the tool ends of the device into the ground.

Another object of my invention is a novel arrangement of parts whereby my device may be employed in the form of either a weed puller, a rake, a spade, a hoe or any other allied agricultural implement.

A further object of my invention is to provide in connection with my weed puller, exchangeable tool ends in the form of forks, solid members or a combination of the two, consisting of a substantially fork-like arrangement provided with a solid webbing between the prong ends, which tools may be readily attached or detached, and used either singly, in pairs or in any desired combination.

Another object of my invention is to provide in connection with my device, means for facilitating the thrusting of the tool ends into the ground when the latter is too hard to yield to manual operation of the tool.

Another object of my invention is to provide in connection with my device an exchangeable pedal rest member, adapted to form a fulcrum for the tool ends, when the latter are being thrust into the ground, while at the same time facilitating the directing of the tool ends into the desired place, and their extraction from the ground, while gripping the weed.

The foregoing and still further objects will become readily evident from the following description and the accompanying drawing, forming part of my disclosure, but by no means intended to limit the scope of my invention to the actual showing, and in which Figure 1 represents an elevation, partly in section, of my tool, operable by means of an extension handle, in its open position.

Figure 2 illustrates the lower portion of the tool, shown in Figure 1 with the tool ends in closed position, as they appear when thrust into the ground.

Figure 3 is a partial side elevation of one of the tool ends showing means for facilitating the latter to be forced into the ground by the pressure of the foot, Figure 4 illustrates a solid exchangeable tool end as may be used instead of the fork-like arrangement shown in Figure 3, and Figure 5 represents a tool end forming a compromise combination between a solid and a fork-shaped tool.

Figure 6 represents a handle, adapted to be exchangeably attachable to one of the tool members of my device.

Referring now to the illustrations, in Figure 1, there will be seen handle bar 33, in the lower end of which is fixedly mounted a tool end 34, extending downwardly into a curved arm 35, provided with means 36 for exchangeably attaching a fork-shaped member 37, shown in side view in Figure 3.

At the enlargement above arm 35, there is provided a pin or bolt 38 adapted to pass not only through tool end 34, but also through tool end 39, which latter is also broadened at its pivotal point and is provided with a curved upper arm 40, terminating in means, indicated at 51, for exchangeably engaging a tool member 42.

To tool end 39, there is secured by means of a convenient arrangement, indicated at 43, a pedal 44, which is exchangeable for a handle, indicated at 45 in broken lines. To tool end 39, there is attached a connecting rod 46 extending upwards and engaging operating lever 47 which is pivoted at 48 to handle 33. A spring 49 connects operating lever 47 with handle 33, to which it is removably attached at 50. Spring 49 tends to keep lever 47 in its position shown in Figure 1, thereby causing connecting rod 46 to bear against tool member 39, thereby holding the two tool ends normally apart. The operating lever may be manually operated by lever extension 51, by drawing the latter against handle 33.

Tool member 34 is provided with a guard 52, shown in broken lines in Figure 3, which surrounds the fulcrum portion of the device. Its lower end 53, shown in section in Figures 1 and 2, serves as limiting means against thrusting the tool too far into the ground and at the same time preventing dirt from forcibly entering the hinge connection between the tool ends. Tool member 34 is also provided with a foot rest 54, extending from the curved portion 35 thereof, and is adapted to facilitate the pressing of tool end 37 into the ground when the latter is not readily yieldable to the force exerted thereagainst by hand.

The curved portions 36 and 40 are so arranged as to be capable of receiving either a fork-like tool end, as seen in Figure 3, or a solid tool end, as seen in Figure 4, or a combination tool end, illustrated in Figure 5. These tool ends are interchangeable, and may be arranged in any suitable combination with one another. They may also be employed singly as will be explained later on.

Particular attention is called to the combination tool end shown in Figure 5. It consists of a basically fork-shaped arrangement, in which the prong ends are connected by a webbing 55, while the prong portions between the middle and the end prongs are omitted. This construction has the advantage of providing a strong earth engaging end for the tool, while permitting a substantially unrestricted discharge of dirt through the openings between the middle and side prongs.

The operation of my device is very simple. When it is desired to extract a plant or weed from the ground, pedal 44 is set in the manner shown in Figure 1, and then handle 33 is either thrust down perpendicularly in the ground, or is swung down towards the side where the pedal is. During the first mode of operation, tool member 37 penetrates into the ground vertically, while tool member 42 will swing against tool end 37 in the manner shown in Figure 5. In the second mode of operation, tool ends 37 and 42 are brought down simultaneously in the position shown in Figure 1, and then handle 33 is swung to the right and causes the closing of the two tool ends, thereby gripping the weed intended to be pulled out.

Normally, spring 49 holds the two tool ends in their open position of Figure 1, however, once the tool ends are closed, by the force of thrusting them into the ground, they may be held in closed position by lever extension 51 of the operating mechanism until the claws are to be released for discharging the pulled out weed.

Guard 52 is preferably made of a strip of relatively stiff material and attached by means of cotter pins, or in any other convenient manner, to one of the tool members, preferably to that connected with handle 33.

My device may be employed in other ways, in addition to its use as weed puller. By removing guard member 52 and pin 38, handle 33 and tool member 34 may form either a forked or a solid spade, depending upon which of the tool ends is attached.

By removing pedal 44, and attaching, instead, handle 45 to tool member 39, either a small rake or a hoe is formed. Thus the utility of my device is greatly enhanced.

The various designs illustrated in the drawing indicate specific constructions of my device, and while they answer the purpose for which they are intended, it is obvious that changes may be made therein and that improvements may be incorporated, without departing from the principal idea of my invention, and I therefore reserve for myself the right to make such changes and improvements within the broad scope of the annexed claims.

I claim:

1. An agricultural implement, comprising fixed and movable tool-end attaching members operatively connected with one another by a common hinge provision, exchangeable tool-ends secured to said members, a guard surrounding said hinge provision for protecting it against damage through forcible contact with earth, and for limiting the penetration of the tool ends into the ground and spring means connected with said movable member for keeping the latter in inoperative position.

2. In an agricultural implement, the combination with guard means, of a pair of tool end attaching members operatively mounted within the former, said members being operatively interconnected by means of a hinge provision, spring means connected with one of the members and adapted to normally keep it away from the other member, means associated with said spring means for bringing and/or keeping the members together, when desired, exchangeable tool-ends secured to the members, said guard means forming a limiting arrangement for preventing the penetration of the tool ends into the ground beyond a desired degree.

3. An agricultural implement, comprising in combination, a pair of exchangeable tool ends, a removable hinge provision operatively connecting them, a handle associated with one tool end, removable pedal provisions associated with the other tool end, the latter having means for accommodating an auxiliary handle, when desired, spring controlled operating means connecting the handle of the first mentioned tool end with the other tool end and adapted to normally keep them spread apart, said operating means adapted to either draw the tool ends together or keep them closed, when desired.

4. In an agricultural implement, as set forth in claim 3, said tool ends comprising substantially fork-shaped member, the prong ends of which are connected, while some of the prong body portions are omitted.

5. An exchangeable tool end for agricultural implements, comprising a generally fork-shaped element having a plurality of prongs, the ends of said prongs being connected with one another, while the body portions of some of the prongs are omitted.

6. The combination with an agricultural implement, of a tool end comprising a substantially fork-shaped member having a plurality of prongs, the ends of the prongs connected by a webbing, so as to present a strong earth engaging terminus, while the body of some of the prongs, are omitted, whereby generous spaces are provided within the tool end body for facilitating an unrestricted discharge of earth therethrough.

ERNEST B. GUSTAFSON.